United States Patent [19]

Fujii et al.

[11] Patent Number: 4,600,241
[45] Date of Patent: Jul. 15, 1986

[54] CANTILEVER TYPE SEATING UNIT SECURED AT THE BACK

[75] Inventors: Hideichi Fujii, Kobe; Takehito Miyake, Kasai; Hiromu Konishi, Kobe, all of Japan

[73] Assignees: Kawasaki Jukogyo Kabushiki Kaisha; Yashiro Kako Ltd.; Kawajusanyo Kogyo Co., Ltd., all of Japan

[21] Appl. No.: 756,561

[22] Filed: Jul. 18, 1985

Related U.S. Application Data

[63] Continuation of Ser. No. 499,254, May 31, 1983.

[30] Foreign Application Priority Data

Jun. 3, 1982 [JP] Japan .................................. 57-94024

[51] Int. Cl.⁴ .............................................. A47C 7/16
[52] U.S. Cl. ..................................... 297/457; 297/244
[58] Field of Search ......... 297/244, 454, 457, DIG. 2, 297/444

[56] References Cited

U.S. PATENT DOCUMENTS

| | | | |
|---|---|---|---|
| 2,473,312 | 6/1949 | Thompson | 297/452 |
| 2,726,713 | 12/1955 | Turner | 297/457 |
| 2,900,014 | 8/1959 | Savage et al. | 297/DIG. 2 |
| 3,146,028 | 8/1964 | Grosfillex | 297/DIG. 2 |
| 3,625,565 | 12/1971 | Barecki | 297/450 |
| 3,630,566 | 12/1971 | Barecki | 297/454 |
| 3,734,561 | 5/1973 | Barecki et al. | 297/DIG. 2 |
| 3,870,366 | 3/1975 | Rogers | 297/450 |
| 4,023,860 | 5/1977 | Harder | 297/444 |

FOREIGN PATENT DOCUMENTS 209197 4/1909 Fed. Rep. of Germany ...... 297/457

*Primary Examiner*—William E. Lyddane
*Assistant Examiner*—Joseph Falk
*Attorney, Agent, or Firm*—Leydig, Voit & Mayer, Ltd.

[57] ABSTRACT

A cantilever type seating unit with a back that can be secured to a wall surface including a shell in the form of a contoured plate having hook members attached to a rear surface of the back and fastening members attached to an undersurface of a seat portion, and a support frame including a pair of L-shaped support arms and a seat plate unitarily connected to the L-shaped support arms and having fastening seats attached to its upper surface. After the support frame is bolted or otherwise connected to the wall surface, the shell can be firmly fastened to the support frame by first hitching the hook members to upper ends of the L-shaped support members and then bringing the fastening members into fastening engagement with the fastening seats. The seating unit is simple in construction, easy to assemble and light in weight.

2 Claims, 10 Drawing Figures

CANTILEVER TYPE SEATING UNIT SECURED AT THE BACK

This application is a continuation of application Ser. No. 499254 filed May 31, 1983.

FIELD OF THE INVENTION

This invention relates to a cantilever type seating unit that can be secured at the back to a wall surface of a vehicle and the like.

DESCRIPTION OF THE PRIOR ART

Figure 1:
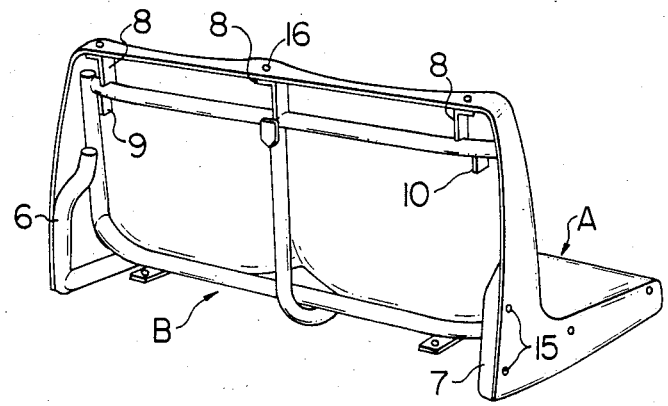
FIG. 1 is a perspective view, as viewed from the rear, of a shell of the prior art.
Figure 3:
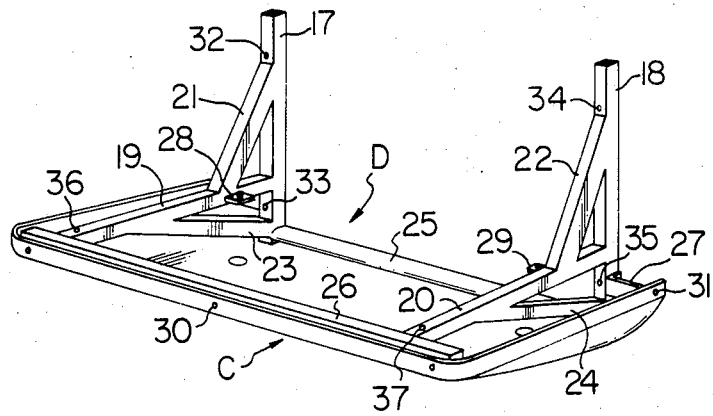
FIG. 3 is a perspective view, as viewed from the front, of a support frame of the prior art.

In one type of sealing unit of the cantilever type of the prior art that can be secured at the back to a wall surface of a vehicle and the like, a shell (for two persons) A formed of plastics is fastened to a frame B formed of metal as shown in FIG. 1, and the frame B is fastened to a support frame D formed of metal having attached thereto a seat plate C of plastics as shown in FIG. 3, after the support frame D is firmly secured to the wall surface of a vehicle, for example.

Figure 2:
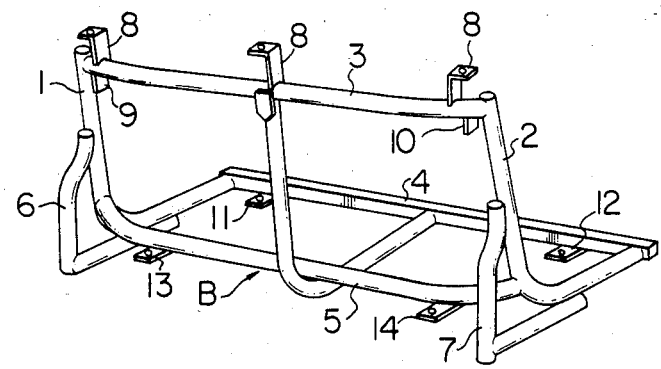
FIG. 2 is a perspective view, as viewed from the rear, of a frame of the prior art.

Referring to FIG. 2, the frame B formed of metal includes a pair of L-shaped support members 1 and 2 located on the left and the right, an upper rear frame member 3 joined by welding at opposite ends to the L-shaped support members 1 and 2, a front frame member 4 joined by welding at opposite ends to the L-shaped support members 1 and 2, a lower rear frame member 5 joined by welding at opposite ends to the L-shaped support frames 1 and 2, a shell stabilizing member 6 joined by welding to the L-shaped support member 1 and a shell stabilizing member 7 joined by welding to the L-shaped support member 2. The upper rear frame member 3 has welded thereto a plurality of shell support members 8 and a pair of projecting members 9 and 10, and the front frame member 4 and the lower rear frame member 5 have welded thereto a pair of fastening members 11 and 12 a pair of fastening members 13 and 14 respectively.

The shell A formed of plastics is secured, as shown in FIG. 1, to the frame B by riveting the shell A to the shell stabilizing members 6 and 7 and the shell support members as indicated at 15 and 16.

Referring to FIG. 3, the support frame D of metal includes a pair of support members 17 and 18 square in cross section located on the left and the right, a pair of arm members 19 and 20 joined by welding to the support members 17 and 18 respectively and extending horizontally, a pair of upper oblique members 21 and 22 joined by welding at opposite ends to the support member and the arm members 17 and 19 and 18 and 20 respectively, a pair of lower oblique members 23 and 24 joined by welding at opposite ends to the support member and the arm members 17 and 19 and 18 and 20 respectively, a rear frame member 25 joined by welding at opposite ends to lower end portions of the support members 17 and 19 and a front frame member 26 joined by welding at opposite end portions to forward ends of the arm members 19 and 20. A pair of brackets 27 are each secured to a lower end portion of one of the support members 17 and 18 (only one bracket 27 associated with the support member 18 being shown) and extend outwardly. A pair of fastening members 28 and 29 are joined by welding to the arm members 18 and 19 respectively.

The bottom plate C of plastics is secured to the support frame D by riveting the seat plate C to the front frame member 26 and the brackets 27 as indicated at 30 and 31.

The support frame D having the seat plate C secured thereto as shown in FIG. 3 is secured to a wall, not shown, of a vehicle by inserting bolts in bolt receiving openings 32 and 33 and 34 and 35 formed in the support members 17 and 18 of the square cross-sectional shape respectively. Then the projecting members 9 and 10 of the metal frame B having the shell A secured thereto as shown in FIG. 1 are inserted in the support members 17 and 18 of the square cross-sectional shape at the opening of upper ends thereof, and the fastening members 11 and 12 of the frame B are secured to the arm members 19 and 20 of the support frame D by inserting bolts in bolt receiving openings 36 and 37 formed in the arm members 19 and 20 respectively while the fastening members 13 and 14 of the frame B are secured to the fastening members 28 and 29 of the support frame D respectively through bolts inserted therein.

As outlined hereinabove, the cantilever type seating unit of the prior art shown in FIGS. 1-3 comprises a first assembly of the shell A of plastics and the metal frame B including members welded together, and a second assembly of the seat plate C of plastics and the support frame D of metal including members welded together. In mounting the seating unit of this construction on a vehicle, for example, the second assembly is first secured to a wall surface of the vehicle and then the first assembly is connected to the second assembly. The seating unit of this construction would suffer the disadvantages in that it is time consuming to fabricate the metal frame B and the metal support frame D including a multiplicity of parts and to secure the assembly to the wall surface of the vehicle. Since the parts are large in number and the assembling is troublesome, the seating unit would be heavy in weight and high in cost.

SUMMARY OF THE INVENTION

This invention has been developed for the purpose of obviating the aforesaid disadvantages of the prior art. Accordingly the invention has as its object the provision of a cantilever type seating unit which is simple in construction, small in the number of parts, easy to fabricate, light in weight and low in cost.

The cantilever type seating unit provided by the invention comprises a shell, a support frame including a pair of support arms and a seat plate secured to the support arms. The support frame is bolted or otherwise secured to a wall surface of a vehicle and the shell is secured to the support frame by fastening means which is simple in construction and easy to operate while allowing the shell to be rigidly clamped to the support member.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENT

A preferred embodiment of the cantilever type seating unit in conformity with the invention will be described by referring to the drawings. The seating unit according to the invention comprises a shell (for example two persons) R shown in FIG. 4, a support frame S shown in FIG. 5 adapted to support the shell R thereon and be connected to a wall surface of a vehicle, for example, and a seat plate T secured to the support frame 8.

Figure 4:
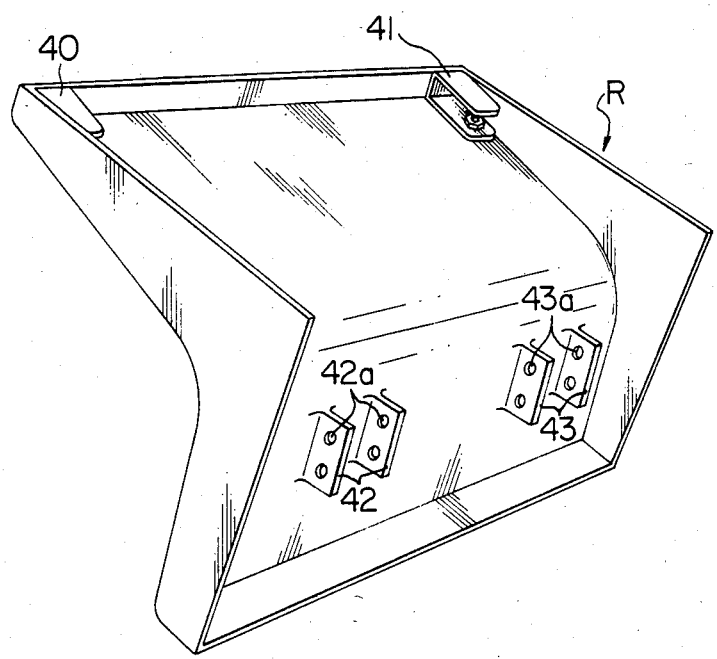
FIG. 4 is a perspective view, as viewed from the rear, of the shell according to the invention.

Referring to FIG. 4, the shell R has attached to a rear surface of its back a pair of elastic hook members 40 and 41 each substantially in the form of an inverted letter U. Two pairs of fastening members 42 and 43 are attached to an undersurface of a seat portion of the shell R and each fastening member 42, 43 is formed with a pair of bolt receiving openings 42a, 43a. It is to be understood, however, that the invention is not limited to the specific number of bolt receiving openings and that only one bolt receiving opening may, of course, be formed in each fastening member.

Figure 5:
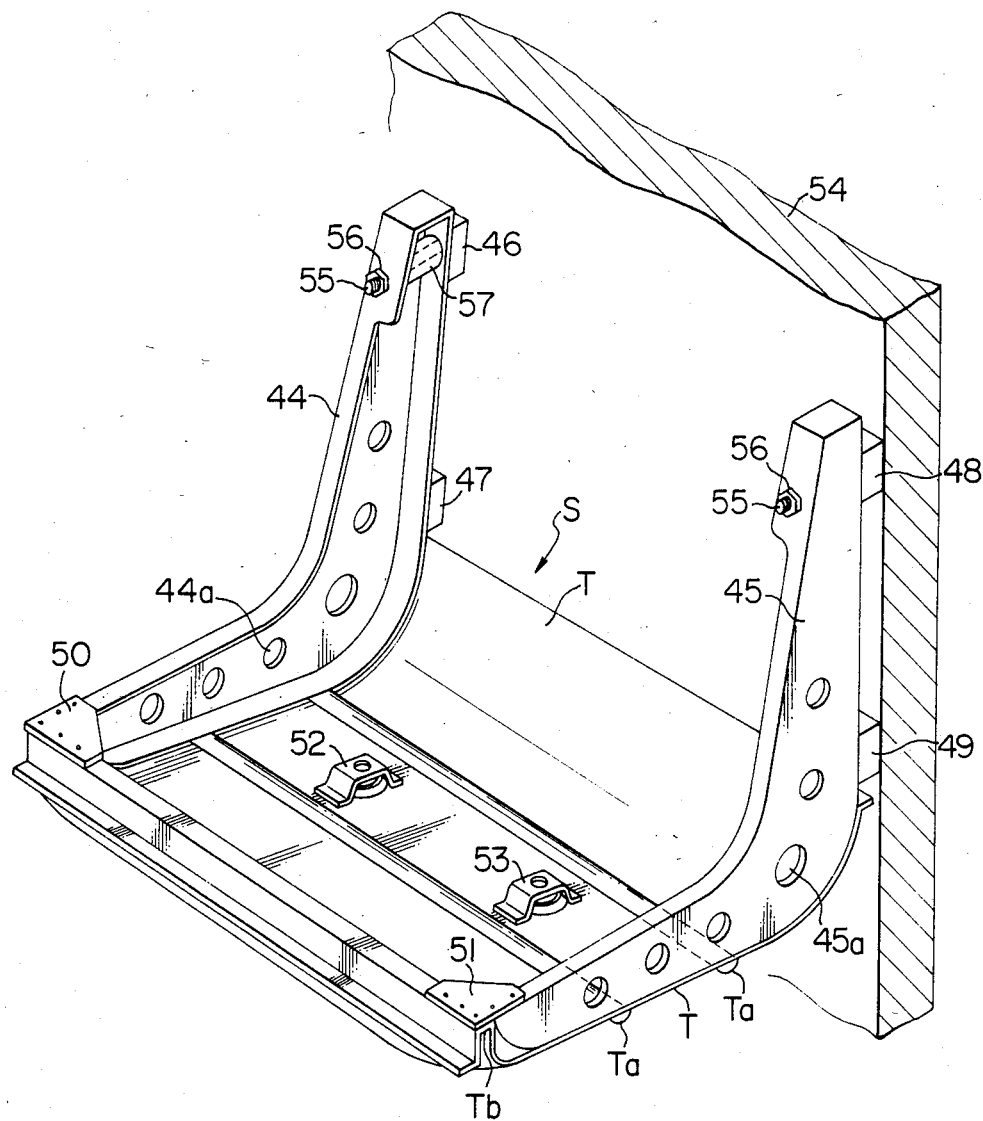
FIG. 5 is a perspective view, as viewed from the front, of the support frame according to the invention.

Referring to FIG. 5, the support frame S includes a pair of L-shaped support arms 44 and 45 and has the seat plate T welded or connected as by bolting or riveting to an undersurface of each of substantially horizontal portions of the support arms 44 and 45. The seat plate T has at least one reinforcing bead Ta.

To reduce weight, the support arms 44 and 45 are formed with a plurality of openings 44a and 45a located at suitable intervals. Spacers 46 and 47 are joined, as by welding, to a substantially vertical portion of the support arm 44 at its back in upper and lower positions. Likewise, spacers 48 and 49 are welded to the support arm 45. The spacers 46–49 are intended to provide a clearance between the support arms 44 and 45 and a wall surface to accomodate the hook members 40 and 41 therein. The spacers 46–49 may be dispensed with by changing the shape of the support arms 44 and 45 in such a manner that a gap can be formed in each of the arms 44 and 45.

Figure 6:
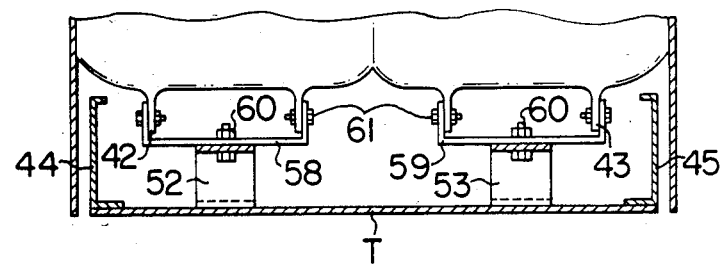
FIG. 6 is a front view of the essential portions of the shell shown in FIG. 4 supported on the support frame shown in FIG. 5 according to the invention.

Reinforcing members 50 and 51 are joined, as by welding, to joints between a bent forward end portion Tb substantially in the form of an inverted letter U in cross section of the seat plate T and forward end portions of the substantially horizontal portions of the support arms 44 and 45 respectively to avoid displacement of the forward end portion of the seat plate T which might otherwise occur due to a load applied to the seat plate T. As shown in FIG. 6, a pair of fastening seats 52 and 53 are joined, as by welding, to an undersurface of the seat plate T.

The operation of assembling and securing the cantilever type seating unit of the aforesaid construction according to the invention to a wall surface 54 of a vehicle, for example, will now be described. As shown in FIG. 5, two bolts 55 extending from the wall surface 54 are inserted in bolt receiving openings formed in the spacers 46 and 48 and channels formed in upper portions of the substantially vertical portions of the support arms 44 and 45 and secured in place by nuts 56, to thereby firmly secure the support frame S to the wall surface 54.

A cylindrical spacer 57 for reinforcing each of the channels of the support arms 44 and 45 through which the bolts 55 extend is mounted on each bolt 55. However, when the support frame S is secured to the wall surface 54 through ribs on the wall surface side of the channels facing the wall surface 54, then the spacers 57 can be done without.

The spacers 47 and 49 perform the function of adjusting the positions of the support arms 44 and 45 so that the support arms 44 and 45 will be located vertically with respect to the seat plate T.

Then the hook members 40 and 41 of the shell R are resiliently fitted over upper ends of the substantially vertical portions of the support arms 44 and 45 respectively to securedly fit the shell R over the support frame S.

Thereafter the fastening members 42 and 43 on the underside of the seat portion of the shell R are bolted to the fastening seats 52 and 53 of the seat plate T. At this time, intermediate seats 58 and 59 of a substantially U-shape are used to clamp the fastening members 42 and 43 to the fastening seats 52 and 53 respectively. More specifically, as shown in FIG. 6, the intermediate seats 58 and 59 are connected by bolts 61 to the fastening seats 42 and 43 respectively, and by bolts 60 to the fastening seats 52 and 53 respectively. The intermediate seats 58 and 59 may be formed integrally with the shell R. When this is the case, the bolts 51 can be dispensed with.

Figure 7:
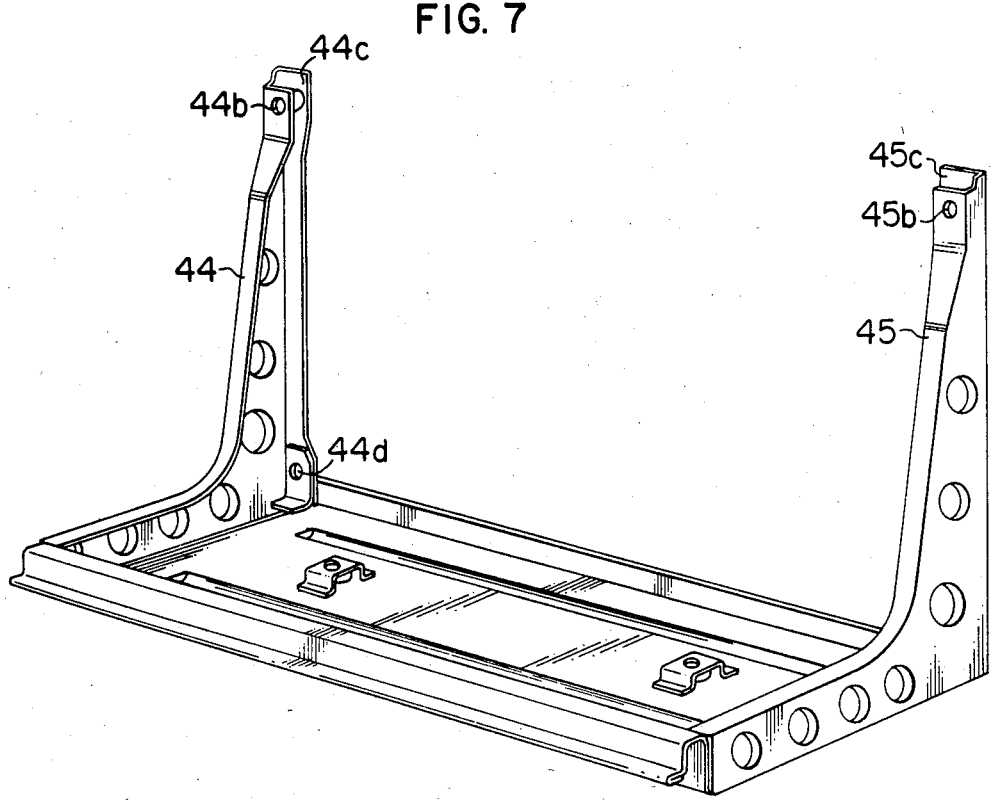
FIG. 7 is a perspective view of a modification of the support frame shown in FIG. 5.
Figure 8:
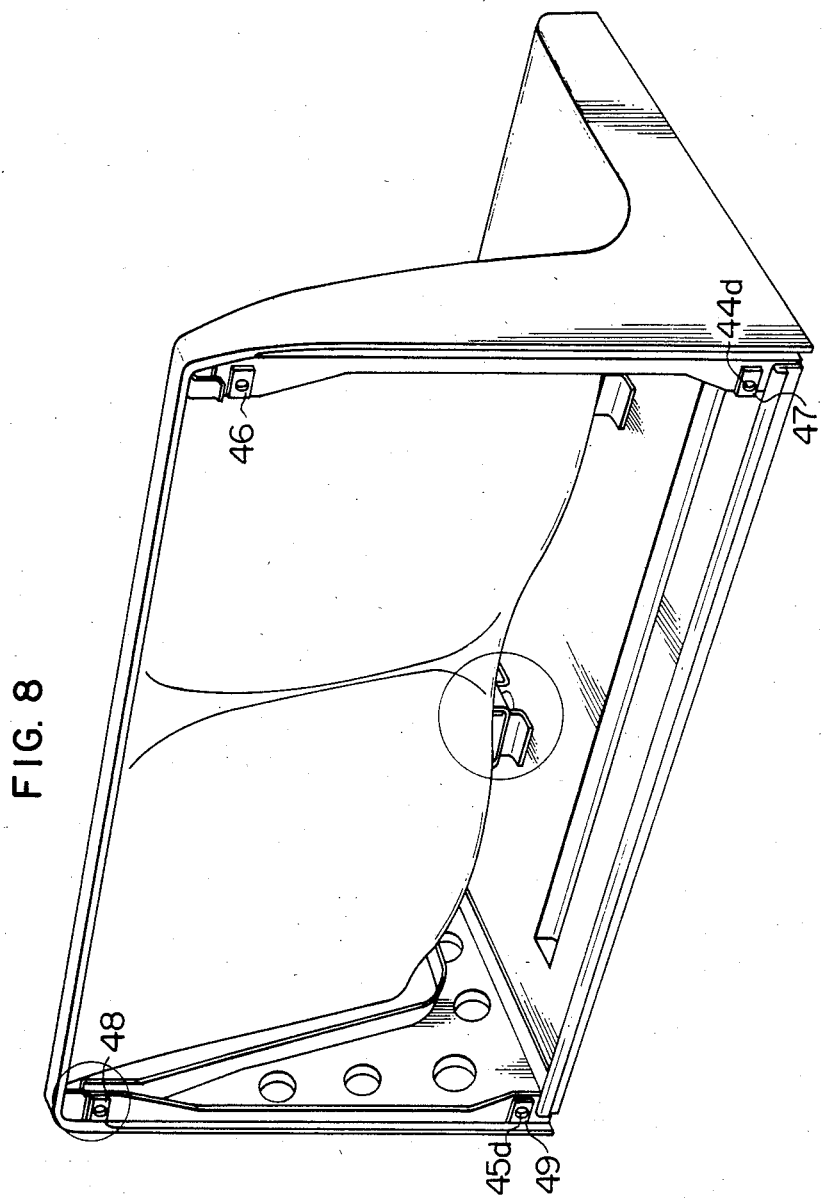
FIG. 8 is a perspective view, as viewed from the rear, of the shell shown in FIG. 4 supported on the support frame shown in FIG. 7 according to the invention.
Figure 9:
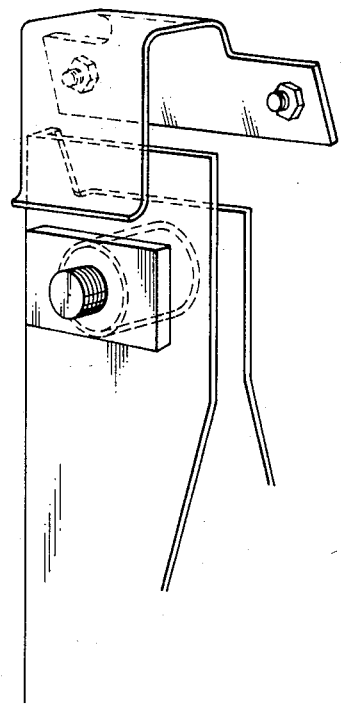
FIG. 9 is a perspective view, on an enlarged scale, of the portion A of FIG. 8.
Figure 10:
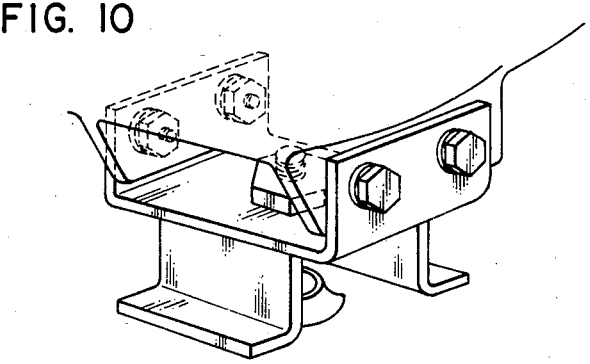
FIG. 10 is a perspective view, on an enlarged scale, of the portion B of FIG. 8.

FIG. 7 shows a modification of the support frame in which the support arms 44 and 45 are formed at their upper ends with flanges 44b and 44c and 45b and 45c juxtaposed against each other and forming pairs. The flanges 44b and 44c and 45b and 45c may be located parallel to each other to eliminate the horizontal flanges interconnecting the two flanges together. Also as shown in FIG. 8, the support arms 44 and 45 may be formed at lower portions of the substantially vertical portions of the support arms 44 and 45 with openings 44d and 45d respectively, to secure the support frame S to the wall surface 54 by bolts inserted in bolt receiving openings at the wall surface 54 through the openings 44d and 45d and openings formed in the spacers 47 and 49.

From the foregoing description, it will be appreciated that the cantilever type seating unit according to the invention comprises a shell only having small parts, such as hook members and fastening members, and a support frame including a pair of L-shaped arms and a seat plate having fastening seats attached to its underside and joined to the L-shaped arms as by welding. Thus as compared with the first assembly of the prior art, the shell according to the invention is more advantageous because it is simpler in construction and lighter in weight. When the shells are stored as reserves, it is possible to store them by piling them a stack in which they are superposed one over another, because no special frames for the shells are required and the apparent volume of the stack of shells can be reduced, thereby enabling a space required for storing them to be reduced. The support frame according to the invention is composed of much formed parts, so that it is simpler in construction and lighter in weight than the second assembly of the prior art.

Thus the invention enables assembling of the shell and the support frame to be readily effected without any trouble. Since the seating unit according to the invention is light in weight, it can be attached to a wall surface without any trouble with increased operation efficiency. Moreover, the seating assembly according to the invention is low in cost.

In the prior art, the seat plate only has the function of serving as a seat cover of the support frame. In the present invention, the seat plate has at least one reinforcing bead and is formed with a bent portion at its forward end, so that the seat plate can perform the function of bearing a load applied to the support frame.

While a preferred embodiment of the invention has been described using specific terms, such description is for illustrative purposes only, and it is to be understood that changes and variations may be made therein without departing from the spirit or scope of the following claim.

What is claimed is:

1. A centilever type seating unit with a back that can be secured to a wall surface of a vehicle and the like comprising:

a substantially rigid shell having hook members attached to a rear surface of a back portion at an upper end thereof and fastening members attached to an undersurface of a seat portion at the middle thereof: and a support frame including a pair of L-shaped support arms of C-shaped cross sections to support said shell along substantially the entire length of its edges, means for securing said arms to a wall surface so as to provide gaps between upper ends of said arms and the wall surface for receiving said hook members over said upper ends, and a seat plate unitarily connected to the L-shaped support arms, said seat plate having fastening seats attached to an upper surface thereof for receiving said fastening members on the undersurface of said seat portion of the shell with the hook members of the shell first hooked to said upper ends of the L-shaped support arms.

2. A cantilever type seating unit with a back that can be secured to a wall surface of a vehicle and the like comprising:

a substantially rigid shell having a pair of resilient hook members attached to a rear surface of a back portion at spaced locations adjacent opposite upper ends thereof and fastening members attached to an undersurface of a seat portion at the middle thereof; and a support frame including a pair of L-shaped support arms to support said shell along substantially the entire length of its edges, means for securing so as to provide gaps between upper ends of said arms and the wall surface for receiving said hook members over said upper ends, and a seat plate unitarily connected to the L-shaped support arms, said seat plate having fastening seats attached to an upper surface thereof for receiving said fastening members on the undersurface of said seat portion of the shell with the hook members of the shell first hooked to said upper ends of the L-shaped support arms.

* * * * *